US012792305B2

(12) United States Patent
Rose

(10) Patent No.: US 12,792,305 B2
(45) Date of Patent: Nov. 10, 2026

(54) TRUNCATED ARRAY FOR PERFORMING DIVISION

(71) Applicant: Imagination Technologies Limited, Kings Langley (GB)

(72) Inventor: Thomas Rose, Watford (GB)

(73) Assignee: Imagination Technologies Limited, Kings Langley (GB)

( * ) Notice: Subject to any disclaimer, the term of this patent is extended or adjusted under 35 U.S.C. 154(b) by 1016 days.

(21) Appl. No.: 18/072,185

(22) Filed: Nov. 30, 2022

(65) Prior Publication Data

US 2023/0229394 A1 Jul. 20, 2023

(30) Foreign Application Priority Data

Nov. 30, 2021 (GB) .................................... 2117319

(51) Int. Cl.
*G06F 7/00* (2006.01)
*G06F 7/52* (2006.01)

(52) U.S. Cl.
CPC .................................... *G06F 7/52* (2013.01)

(58) Field of Classification Search
USPC ................................ 716/101, 102, 103, 104
See application file for complete search history.

(56) References Cited

U.S. PATENT DOCUMENTS

2013/0007085 A1* 1/2013 Drane .................... G06F 30/30 708/551
2013/0103733 A1* 4/2013 Drane .................... G06F 30/327 708/650
2014/0195581 A1 7/2014 Wilkins
2016/0097808 A1* 4/2016 Drane .................... G06F 30/327 714/725
2017/0371621 A1* 12/2017 Drane .................... G06F 30/327
2017/0371622 A1* 12/2017 Drane .................... G06F 30/327
2021/0165634 A1 6/2021 Drane
2021/0271795 A1 9/2021 Drane

* cited by examiner

*Primary Examiner* — Brian Ngo
(74) *Attorney, Agent, or Firm* — Potomac Law Group, PLLC; Vincent M DeLuca

(57) ABSTRACT

A computer-implemented method for deriving a hardware representation of a fixed logic circuit for performing division of an input x by a divisor selectable from a plurality of divisors, where x is an m-bit integer, includes normalising each of the plurality of divisors to form a plurality of multipliers; forming a summation array arranged to multiply the input x by any one of the plurality of multipliers; truncating the summation array by discarding all columns less significant than the $k^{th}$ column of the summation array below the position of a binary point, where $k=[\log_2 m]$; determining a corrective constant in dependence on the maximum sum of the partial products discarded from the summation array for at least one of the multipliers; and generating a hardware representation of a fixed logic circuit implementing the truncated summation array including the corrective constant.

20 Claims, 6 Drawing Sheets

TRUNCATED ARRAY FOR PERFORMING DIVISION

BACKGROUND

This invention relates to methods and apparatus for deriving a fixed logic circuit implementing division using a truncated summation array.

When designing integrated circuits, logic is often required to perform addition, subtraction, multiplication and division. Whilst addition, subtraction and multiplication operations can all be cheaply implemented in hardware, division is acknowledged to be an expensive operation to implement in hardware.

In the case that the divisor is known to be a constant at design-time, a division operation can be expressed as multiplication by a constant rational (i.e. a fraction of two integers) and it is possible to construct efficient implementations of the division operation using a combination of addition and constant multiplication logic. This can significantly simplify the logic and hence reduce the area of integrated circuit needed to implement the division operation. For example, if the division operation y=px/q, where p and q are integer constants and x is an integer or fixed point variable, can be rewritten in the form $(ax+b)/2^k$, then the division operation can be expressed in logic as a multiply-add operation whose result is right-shifted by k binary places.

Another method for performing division by means of multiplication by a constant rational is to take the binary expansion of $$\frac{p}{q}$$

(typically infinite but recurring) and to consider the infinite addition array formed by multiplication with x. The array may be truncated in such a way as to guarantee that the remaining finite array sums to an answer for y which is faithfully rounded (where faithful rounding is a scheme with an error tolerance which allows rounding towards either positive or negative infinity). For example, UK Patent GB2551725 describes truncating an infinite single summation array representing multiplication by an invariant rational. The truncation is performed by identifying a repeating section of the array and discarding all but a finite number of the repeating sections while satisfying a defined error bound.

In order to perform division operations by a set of different divisors in fixed logic circuitry, it is generally necessary to provide a number of different fixed logic circuits each configured to perform division by a divisor of the set. Alternatively, programmable logic can be provided but at significant cost in terms of circuit area, complexity and speed.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A computer-implemented method for deriving a hardware representation of a fixed logic circuit for performing division of an input x by a divisor selectable from a plurality of divisors, where x is an m-bit integer, the method comprising:

- normalising each of the plurality of divisors to form a plurality of multipliers;
- forming a summation array arranged to multiply the input x by any one of the plurality of multipliers;
- truncating the summation array by discarding all columns less significant than the $k^{th}$ column of the summation array below the position of a binary point, where $k=[\log_2 m]$;
- determining a corrective constant in dependence on the maximum sum of the partial products discarded from the summation array for at least one of the multipliers; and
- generating a hardware representation of a fixed logic circuit implementing the truncated summation array including the corrective constant.

The method may further comprise further truncating the summation array by discarding the τ least significant rows of the finite summation array remaining after the truncation of the summation array at the $k^{th}$ column, where $\tau=2^k-m$.

The normalising may be performed such that each of the plurality of multipliers lies in the range [1,2) when expressed in decimal format.

The normalising may comprise forming each of the plurality of multipliers as $2^i$ divided by the respective divisor, where i is selected such that the multiplier is in the range [1,2) when expressed in decimal format.

The method may further comprise encoding each multiplier by storing i and a predetermined number of bits of the multiplier immediately after its binary point.

The predetermined number of bits may be $m+[\log_2 m]-1$ bits.

The truncated summation array may include fewer than $m+[\log_2 m]-1$ rows.

The determining the corrective constant may comprise using as the corrective constant the largest maximum sum of the partial products discarded from the summation array calculated for the at least one of the plurality of multipliers.

The calculating the maximum sum of the partial products discarded from the summation array may comprise, for each divisor $q_j$ corresponding to the at least one of the plurality of multipliers, determining the difference between $$\text{round}\left(\frac{1}{q_j} * x_{high}\right)$$

and the output of the truncated summation array, where $x_{high}$ is the input x having binary 1 for all bit values and round( ) is a rounding mode according to which the division operation is to be performed.

The rounding mode may be one of RTZ, RTNI, RTPI, RAZ, RTU, RTD, RNTZ, RNAZ, RTE and RTO.

The determining the corrective constant may comprise calculating for each of the plurality of multipliers the maximum sum of the partial products discarded from the summation array.

The method may further comprise storing the corrective constant determined for each multiplier for use in the hardware representation of the fixed logic circuit, wherein the generating the hardware representation of the fixed logic circuit comprises defining logic for selecting at run time the appropriate corrective constant in dependence on the divisor selected from the plurality of divisors.

The method may further comprise, performing the calculation of the maximum value of the bits discarded from the summation array for a plurality of rounding modes and storing the corrective constant determined for each of the plurality of rounding modes for use in the hardware representation of the fixed logic circuit, wherein the generating the hardware representation of the fixed logic circuit comprises defining logic for selecting at run time the appropriate corrective constant in dependence on the rounding mode according to which the division operation is to be performed.

The method may further comprise truncating the corrective constant by discarding all bit values less significant than the $k^{th}$ column of the summation array below the position of a binary point.

The generating the hardware representation of the fixed logic circuit may comprise implementing the truncated summation array using AND gates arranged to, at run time, combine each bit value of x in a row with the corresponding bit value of the multiplier corresponding to the selected divisor.

There is provided a fixed logic circuit for performing division of an input x by a divisor selectable from a plurality of divisors, where x is an m-bit integer, the circuit comprising:

- an input configured to receive x and an indication of a selected divisor from the plurality of divisors;
- a stored plurality of multipliers corresponding to normalised versions of the plurality of divisors;
- a truncated summation array arranged to multiply the input x by any one of the plurality of multipliers, where the number of rows of the truncated array is fewer than $m+[\log_2 m]-1$;
- logic configured to retrieve a multiplier from the stored plurality of multipliers based on the indication of the selected divisor and cause the truncated summation array to multiply the input x by the retrieved multiplier so as to form a first result;
- at least one stored corrective constant;
- an adder arranged to add the corrective constant to the first result so as to form a second result; and
- an output configured to output the second result.

The at least one stored corrective constant may include a corrective constant for each of the plurality of multipliers and the logic is further configured to select a corrective constant corresponding to the retrieved multiplier for addition at the adder.

The input may be further configured to receive an indication as to in which of a plurality a rounding modes the fixed logic circuit is to operate and the at least one stored corrective constant includes a corrective constant for each of the rounding modes, the logic being further configured to select a corrective constant corresponding to the indication of the rounding mode.

There is provided apparatus configured to generate a hardware representation of a fixed logic circuit for performing division of an input x by a divisor selectable from a plurality of divisors, where x is an m-bit integer, the apparatus comprising:

- a processor;
- a memory comprising computer executable instructions which, when executed, cause the processor to:
- normalise each of the plurality of divisors to form a plurality of multipliers;
- form a summation array arranged to multiply the input x by any one of the plurality of multipliers;
- truncate the summation array by discarding all columns less significant than the $k^{th}$ column of the summation array below the position of a binary point, where $k=[\log_2 m]$;
- determine a corrective constant in dependence on the maximum sum of the partial products discarded from the summation array for at least one of the multipliers; and
- generate a hardware representation of a fixed logic circuit implementing the truncated summation array including the corrective constant.

The fixed logic circuit may be embodied in hardware on an integrated circuit. There may be provided a method of manufacturing, at an integrated circuit manufacturing system, a fixed logic circuit. There may be provided an integrated circuit definition dataset that, when processed in an integrated circuit manufacturing system, configures the system to manufacture a fixed logic circuit. There may be provided a non-transitory computer readable storage medium having stored thereon a computer readable description of a fixed logic circuit that, when processed in an integrated circuit manufacturing system, causes the integrated circuit manufacturing system to manufacture an integrated circuit embodying a fixed logic circuit.

There may be provided an integrated circuit manufacturing system comprising: a non-transitory computer readable storage medium having stored thereon a computer readable description of the fixed logic circuit; a layout processing system configured to process the computer readable description so as to generate a circuit layout description of an integrated circuit embodying the fixed logic circuit; and an integrated circuit generation system configured to manufacture the fixed logic circuit according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
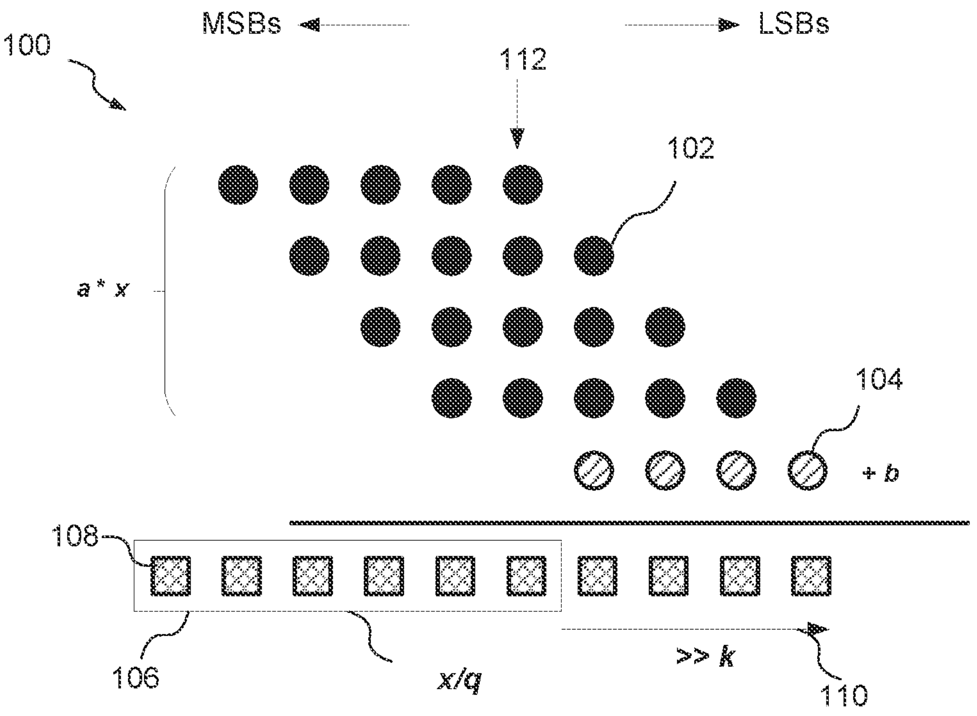
FIG. 1 is a schematic representation of a binary array of addition operations for performing division of a variable x by a constant divisor q as a multiply-add-shift operation.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

When modern integrated circuits (IC) designs are produced, these usually start with a high-level design specification which defines the functionality required using a high level programming language that enables logical verification of the design. A register transfer level (RTL) model may then be synthesised (e.g. using commercially available tools) so as to produce a netlist of gates for implementation in silicon. The RTL model can be optimised to determine a preferred implementation of the design in silicon.

Division of a variable x by a constant divisor q can be expressed as a multiply-add-shift operation. For example, with a round towards negative infinity (RTNI) or round towards zero (RTZ) scheme, the division operation can be expressed as the floor of a multiply-add-shift operation:

$$y = \left\lfloor \frac{x}{q} \right\rfloor = \left\lfloor \frac{ax + b}{2^k} \right\rfloor = (ax + b) >> k \tag{1}$$

The rightmost notation indicates that the division operation reduces to a multiplication of the variable x by a constant a followed by an addition of a constant b, with the result right-shifted by k places. In other words, x is summed a times and constant b is added to the result, which is then shifted by k. This summation is illustrated as a binary array of addition operations 100 in FIG. 1 in which each filled circle 102 represents a bit of the variable x and each shaded circle 104 represents a bit of the constant b. The output 106 is right shifted k bits 110, with each square 108 representing a bit of the output y. The shape of the array of bits of x is a parallelogram formed from repeated rows of x offset relative to each other, where the maximum number of rows corresponds to the number of bits in a. The bits of x in each row are AND-ed with a corresponding bit of a (e.g. the top row is AND-ed with the MSB of a, and so on until the bottom row is AND-ed with the LSB of a). In this way, rows are skipped (or treated as all zeroes) where there is a 0 in the corresponding bit of a, and rows are included where there is a 1 in the corresponding bit of a. As such, the array may not be a smooth parallelogram shape (as shown in this example), but be more irregular due to some offsets being skipped due to 0 bits in a (as illustrated in later figures).

In the schematic representation shown in FIG. 1, the bits of the variables and constants are arranged in columns 112, with each column corresponding to a bit position in the output y. The most significant bits (MSBs) are on the left-hand side and the least significant bits (LSBs) are on the right-hand side of the figure. The multiplication is calculated by summing all the bits of the array 100 and shifting the result.

An alternative to using the multiply-add-shift operation outlined above is to form an array from the full binary expansion of 1/q, such that there is an array with one row of x for each bit value of 1 in the binary expansion of 1/q (offset in the parallelogram form according to the location of the 1 in 1/q). However, the binary expansion of 1/q may be arbitrarily large or infinite, making such an array impractical to form in hardware.

However, where the precision of the sum of addends required is lower than that provided by a full summation, the array may be truncated so as to produce a less accurate result but one which can be achieved with a smaller binary logic circuit (or in the case of an infinite binary expansion, one that is implementable in practice). For example, one or more of the least significant columns of the multiplication array may be truncated (i.e. discarded). To compensate for this truncation a constant may be added to the multiplication result so as to achieve the required level of accuracy. Thus, truncation may comprise discarding some of the columns of the input bits and the adding of a constant to one or more of the remaining columns to provide an approximation to the true multiplication result. Synthesis of such an arrangement in RTL will result in a smaller netlist and will therefore enable a multiplier to be manufactured using fewer gates and thus less silicon. This will reduce the cost and consume less power.

Truncated summation arrays are however limited in that they are able to perform division x by a single constant q. It is desirable to be able to perform a set of different division operations in hardware without losing the size and speed benefits of using fixed function logic.

Described herein are methods for implementing a set of division operations in hardware logic to a level of accuracy sufficient to represent the result of that set of division operations for all m-bit inputs x according to a selected rounding scheme.

Consider an m-bit integer (i.e. whole number or fixed point number) input, x[m−1:0] which is to be divided by a constant divisor q according to the operation $\lfloor x/d \rfloor$ (where $\lfloor\ \rfloor$ represents the floor function, also known as round towards negative infinity (RTNI)). Performed at a truncated summation array so as to give an approximate result, this operation can be expressed as:

$$y[t-1:0] = \left\lfloor \frac{x[m-1:0]}{q} \right\rfloor \tag{2}$$

where q∈N (a natural number) and t is some value where y[t−1:0] is a large enough signed number to represent all possible outputs given the input x. The value t is a function of m, q and so can be identified at design time according to any suitable method.

In the examples given herein, floor rounding is used, but it will be apparent to those skilled in the art that the principles described herein can be extended to other rounding modes. Examples of types of rounding modes include "directed rounding" (such as rounding towards or away from zero or towards positive or negative infinity) or "round-to-nearest" (such as rounding to nearest integer, with ties to even, odd, up or down)—such rounding schemes have an accuracy of at least ½ ULP ("unit in the last place" or "unit of least precision"). This can be contrasted with faithful rounding which is typically achieved through other approaches using truncated arrays, and provides an accuracy of at least 1 ULP. Table 1 below gives some examples of directed rounding and round to nearest schemes/modes, although it will be understood that this is not exhaustive and further schemes will be known to those skilled in the art. Similarly, it will be apparent that the principles described herein may be applied to unsigned inputs (and outputs). Furthermore, whilst the examples provided herein use binary numbers in regular form, they can also be ready adapted to operate on binary numbers in their canonical signed digit (CSD) form.

TABLE 1

| Type | Acronym | Description |
|---|---|---|
| Directed | RTZ | Round towards zero |
| Directed | RTNI | Round towards negative infinity (also called "floor") |
| Directed | RTPI | Round towards positive infinity (also called "ceiling") |
| Directed | RAZ | Round away from zero |
| Round-to-nearest | RTU | Round to nearest, ties up |
| Round-to-nearest | RTD | Round to nearest, ties down |
| Round-to-nearest | RNTZ | Round to nearest, ties towards zero |
| Round-to-nearest | RNAZ | Round to nearest, ties away from zero |
| Round-to-nearest | RTE | Round to nearest, ties to even |
| Round-to-nearest | RTO | Round to nearest, ties to odd |

It will be shown that the binary expansion of $$\frac{1}{q}$$

always takes the form of a concatenation of bits B with an infinite repeating sequence of bits A:

B A A A . . .

Where $B \in \mathbb{Z}$ (an integer) and $A \in \mathbb{N} \cup \{0\}$ (a natural number or zero) which is an infinitely repeating sequence. The expansion may be left padded with zeros so as to be width n (see below), with the binary point being located somewhere along the infinite expansion (including to the left of B).

In order to derive the binary expansion, we note that there will exist i such that $q = 2^i \acute{q}$ where $\acute{q}$ is odd (or, equivalently, coprime to 2). It follows that:

$$\frac{1}{q} = \frac{1}{2^i}\left(\frac{1}{\acute{q}}\right) = \frac{1}{2^i}\left(B + \frac{\bmod \acute{q}}{\acute{q}}\right) \tag{3}$$

where $$B = \left\lfloor \frac{1}{\acute{q}} \right\rfloor \in \mathbb{Z}$$

and mod $\acute{q} \in [0, \acute{q}-1]$, and so $$\frac{\bmod \acute{q}}{\acute{q}} \in [0, 1).$$

Since $\acute{q}$ is odd, there is a well-known result that says that there will exist $n \in \mathbb{N}$ such that $2^n-1$ is an integer multiple of $\acute{q}$:

$$c\acute{q} = 2^n - 1, \text{ and so } \frac{\bmod \acute{q}}{\acute{q}} = \frac{c(\bmod \acute{q})}{c\acute{q}} = \frac{A}{2^n - 1} \tag{4}$$

Note that $c(\bmod \acute{q}) = A \in (0, 2^n-1)$ is an n bit unsigned integer since $$\frac{\bmod \acute{q}}{\acute{q}} \in (0, 1)$$

is a purely fractional number, so $$\frac{A}{2^n - 1}$$

represents each of the infinitely recurring blocks of length n in the binary expansion of $$\frac{1}{\acute{q}}.$$

In other words:

$$\frac{1}{q} = \frac{1}{2^i}\left(B + \frac{A}{2^n - 1}\right) \tag{5}$$

Figure 2:
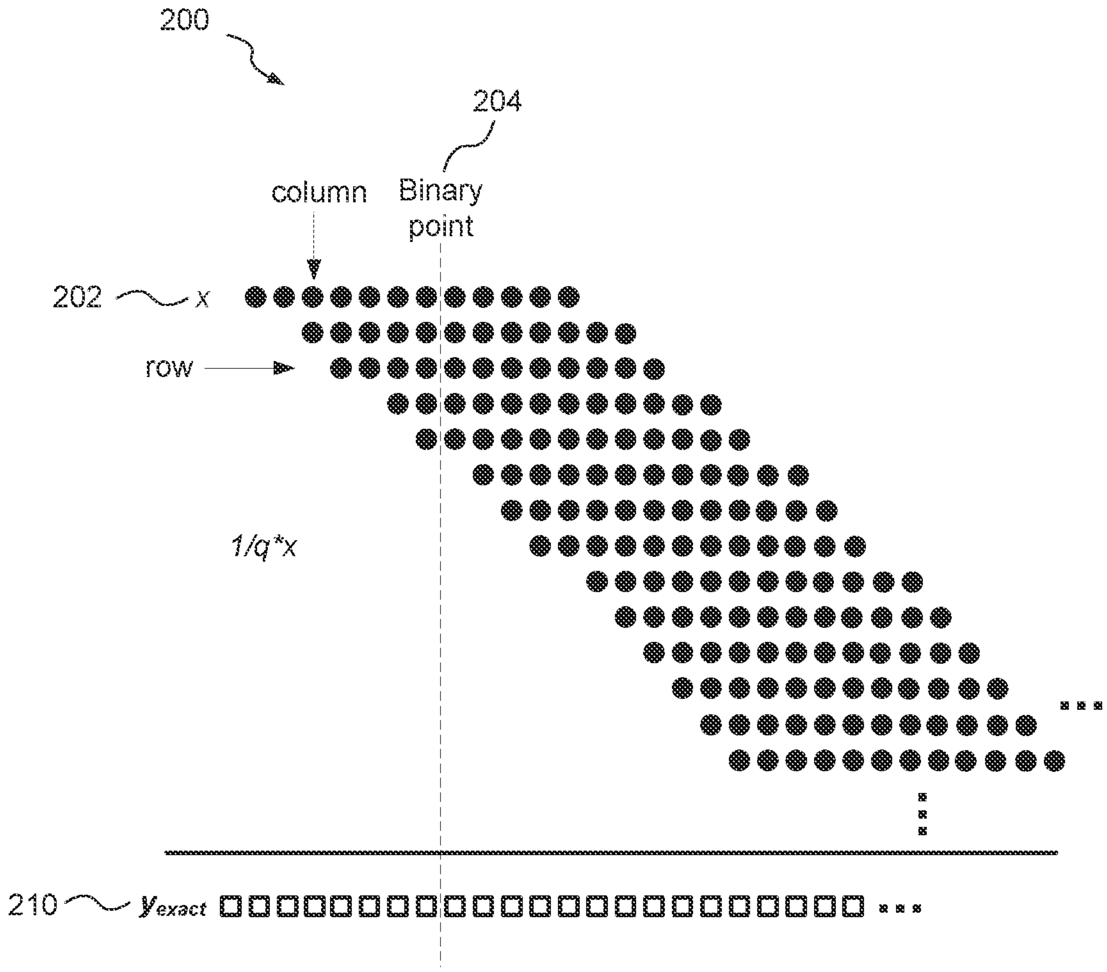
FIG. 2 shows an infinite summation array arranged to perform division of a variable x by a constant divisor q.

An infinite summation array 200 arranged to perform the operation x/q is shown in FIG. 2. Each row 202 of the array comprises x in binary form. For non-trivial cases, the expansion of 1/q is infinite in length and therefore the array 200 is infinite in size. This is because the division operation x/q can be considered to be a multiplication $$\frac{1}{q} * x$$

which, in binary can be equivalently represented as a summation of x with itself an infinite number of times where each x is offset relative to a binary point 204 according to the bit position of a corresponding non-zero bit of 1/q in the infinite expansion. Note that an infinite expansion of 1/q will comprise an infinite number of non-zero bits. As will be well understood to a person skilled in the art of binary logic circuits, the array 200 represents such an infinite summation.

Array 200 of FIG. 2 shows a summation array for a particular constant divisor q. Since the array includes the complete infinite expansion of 1/q and hence an infinite number of rows of x, the output $y_{exact}$ 210 of the array is perfectly accurate and likely itself infinite in length.

General Truncated Array

Methods will now be described to derive fixed logic hardware comprising a summation array configured to perform division of an input x[m−1:0] by a divisor $q_j$ selected at run time from a set of divisors $\{q_j\}$. It will be appreciated that the principles described herein may be readily extended to performing multiplication ay a rational $$\frac{p}{q_j}$$

where p, $q_j$ are coprime constants for all j. This can be achieved, for example, by considering the expansion of the rational $$\frac{p}{q_j}$$

instead of $1/q_j$, or by providing fixed logic to multiply the output of the summation array by p.

As has been demonstrated, in its general form, an additive array for performing multiplication by a binary expansion of a rational 1/q would be infinite in size because the binary expansion of the rational 1/q for non-trivial cases is infinite in length. In order to render such an array implementable in hardware, it is necessary to form an array which is finite in size—i.e. an array arranged to sum a finite number of partial product bits. A finite array would, in general, calculate an approximation to the true result of the multiplication operation. However, as is well known in the art, it is possible to truncate the infinite array and correct the approximation through the addition of a constant in a manner which satisfies a required accuracy according to a defined rounding scheme.

Figure 3:
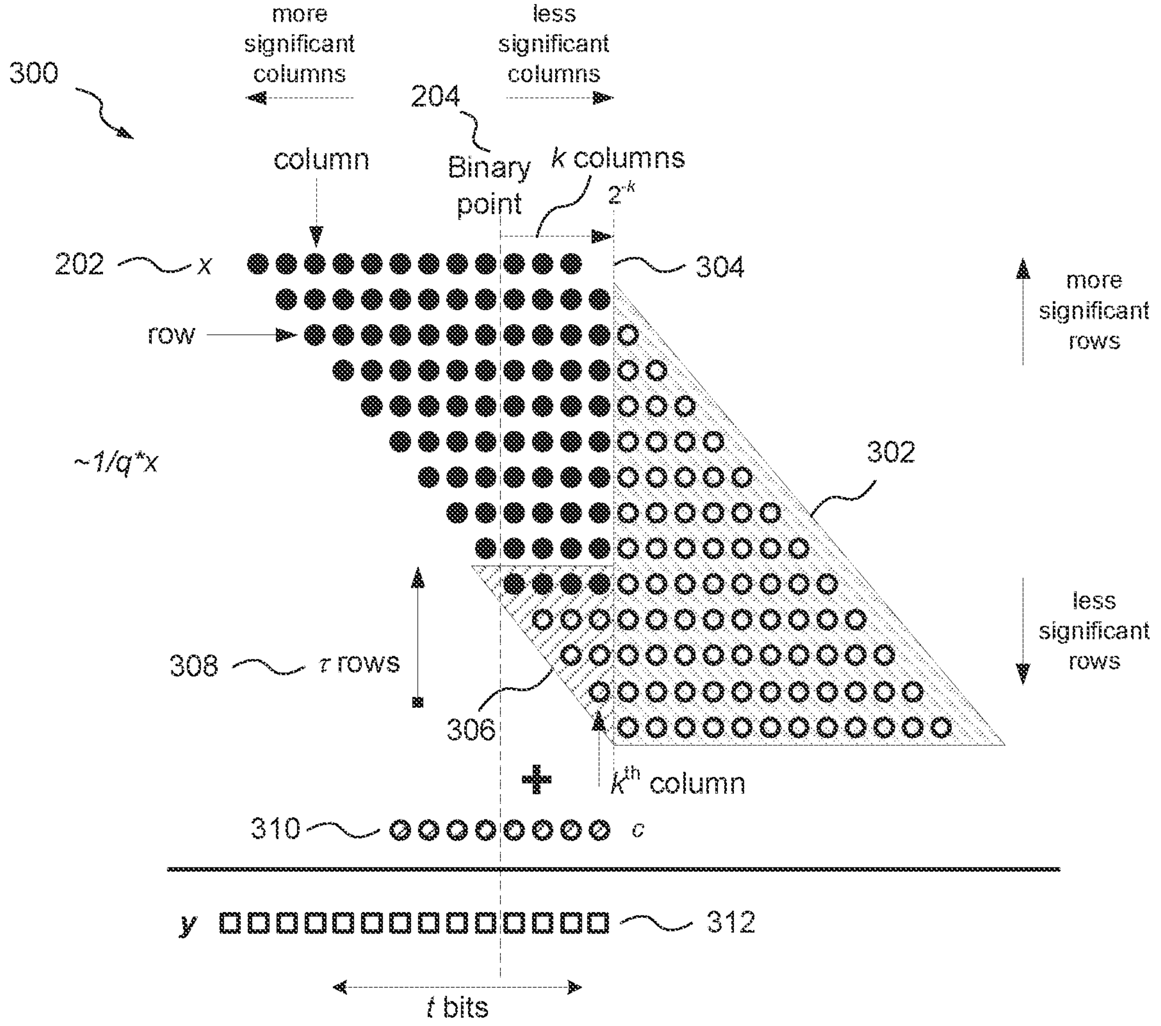
FIG. 3 is a schematic diagram illustrating a generic finite summation array for performing multiplication of an input x by a binary expansion of 1/q.

FIG. 3 is a schematic diagram illustrating a generic finite summation array 300 for performing multiplication of an input x by a binary expansion of $1/q_j$ with floor rounding, that is:

$$y[t-1, 0] = \left\lfloor \frac{x}{q_j} \right\rfloor \tag{10}$$

The array 300 is generic because the multiplier $1/q_j$ is not defined: it could take a range of different values corresponding to the set of divisors $\{q_j\}$.

The bits 202 of each row of the array comprise the input x. This is because performing the multiplication $$\frac{1}{q_j} * x$$

comprises summing $$x \frac{1}{q_j}$$

times. The array comprises a binary point 204 with respect to which the bits of x are arranged. Because $q_j$ can take any one of a set of values and therefore it is not known at design time which rows correspond to a 0 of the expansion of $$\frac{1}{q_j},$$

unlike array 200, each row of array 300 is offset by 1 bit position so as to enable the array to handle non-zero bits at any bit position of the expansion of $$\frac{1}{q_j}$$

within the scope of the finite array.

For non-trivial cases, the expansion of $1/q_j$ will be infinite in length. In order to derive an array which is finite in size and may therefore be implemented in hardware, the array is truncated by removing an infinite set of least significant bits 302 of the array of bits of x as will be described below. A further set of bits 306 of the least significant rows 308 of the array may be further removed, as will also be described below. Such a finite array will generate an approximate result.

The array 300 further comprises addition of a corrective constant c 310 which—to the precision of the t-bit output y—is selected to compensate for the truncation of the bits 302 and optionally 306 such that the output y is accurate to t bits for all x, j with floor rounding (or another rounding mode such as those listed in Table 1). The constant c may be calculated in any suitable manner, with various algorithms being known in the art such as Constant Correction Truncation (CCT), Variable Correction Truncation (VCT) and Hybrid Correction Truncation (HCT). At its full precision, the corrective constant may be infinitely long according to the technique by which it is calculated, but to ensure the array is finite in size the corrective constant c included in the array 300 is truncated at the same column 304 at which the array of partial products are truncated.

Methods will now be described to programmatically derive a finite size array for performing equation (10) to a level of accuracy which allows all possible outputs to be represented for all inputs x and each of the set of divisors $q_j$. The methods enable a suitable corrective constant to be found.

Consider the operation $$\left\lfloor \frac{x}{q_j} \right\rfloor$$

where x is an m-bit long integer and $q_j$ is a natural number divisor selected from a set of divisors $\{q_j\}$ where $q_j=2^n-1$ for a set of values n. In other words, $\{q_j\}=\{3, 5, 7, 9, 11, 13 \ldots\}$. In binary, powers of 2 are equivalent to shifting the binary point and so in hardware do not require calculation at an array of logic gates—they can be achieved by suitable hardwired connections. The output of the operation y[t−1,0] is a t-bit integer which is large enough number to represent all possible outputs given the input x and the set of divisors $\{q_j\}$. The value t is a function of m, $q_j$ and so can be identified at design time according to any suitable method.

Each divisor in the set of divisors is normalised so as to define a multiplier $\hat{q}_j$ in the range [1,2):

$$\hat{q}_j = \frac{2^i}{q_j} \tag{11}$$

where i is a positive integer. This enables the division operation $x/q_j$ to be expressed as:

$$\left\lfloor \frac{x}{q_j} \right\rfloor = 2^{-i} \lfloor \hat{q}_j x \rfloor \tag{12}$$

and i is selected such that $\hat{q}_j$ has the decimal form "1.xxxxxxx . . . ", i.e. it is a rational number that is ≥1 and <2. The multiplication by $2^{-i}$ in equation (12) merely represents a left shift of the output of an array configured to perform the division operation [$\tilde{q}_j$x] and need not be considered further in deriving a suitable truncated array. Each divisor in the set of divisors $\{q_j\}$ can be normalised to form a set of multipliers $\{\tilde{q}_j\}$.

Universal Truncation

Summation array 300 in FIG. 3 is a generic array for which the multiplier 1/q has not been defined. Since it is not known which bits of the multiplier are zero, it is not therefore possible to discard rows of the array and every row is offset from the adjacent row(s) by 1 bit position. This is important to ensure that an array derived according to the principles set out herein can perform a division operation for a set of different divisors.

Since $\hat{q}_j$ has a value lying between 1 and 2 it is possible to identify a general truncation of a summation array configured to perform the division operation $\lfloor \hat{q}x \rfloor$ such that the output of the truncated array is accurate to t bits over possible inputs of bit length m. It can be shown that one such truncation of the array is to remove all columns less significant than the column k bits below (i.e. in the less significant direction) below the binary point, where:

$$k = \lceil \log_2 m \rceil \tag{13}$$

The notation ⌈ ⌉ denotes the ceiling operator (round towards positive infinity). The $k^{th}$ column below binary point 204 is indicated in the example shown in FIG. 3 by boundary 304. In the example of FIG. 3, the length of x is 12 bits, i.e. m=12, so k=4. The removed bits 302 represent an infinite set of bits in the columns less significant than the $k^{th}$ column.

It is possible to further reduce the size of the array without affecting the output over all m-bit x by removing the τ least significant rows of the finite array remaining after the removal of the set of bits in the columns less significant than the $k^{th}$ column, where:

$$\tau = 2^k - m \tag{14}$$

and 0≤τ<M.

It can be shown that an array truncated in such a manner will have a finite number of rows which is approximately less than:

$$m + \lceil \log_2 m \rceil - 1 \tag{15}$$

The least significant rows of the array are those which include partial product bits in the least significant columns of the array but do not have bits in the more significant columns of the array. As indicated in the figure, for columns to the left of the kth column in FIG. 3, the most significant column is the left-most column of partial product bits furthest from the kth column, and the least significant column is the right-most column of partial product bits closest to the kth column. In the example shown in FIG. 3, removing the T least significant rows 308 results in removal of the bits 306, resulting in a finite array comprising the partial product bits represented by the filled circles. In the example of FIG. 3, where m=12 and k=4, this gives a value of τ=4, i.e. the least significant four rows can be discarded.

Other approaches which may be used at design time to establish a suitable truncation of the array, including by starting the search for a suitable column at or close to the most significant columns of the array and exhaustively testing each column in the direction of the least significant columns until a truncation for all x, $q_j$ is identified which provides the desired accuracy whilst minimising the size of the array. The above approach is advantageous in that it provides a heuristic approach for identifying suitable truncations. Further refinement of the truncation may be performed. The truncation identified above may not represent the optimal truncation.

Corrective Constant

By truncating columns less significant than the $k^{th}$ column, and optionally further removing the τ least significant rows, it is possible to determine a (possibly truncated) value for the corrective constant c which works over all x and for all $\hat{q}_j$. This is because $\hat{q}_j$ has been normalised so as to lie between (in decimal) 1 and 2.

By way of illustration, an example method for determining a value for the corrective constant c (subject to truncation at column 304) will now be described for the case where x is unsigned. It will be readily apparent that this example can be extended to the case where x is signed. The infinite set of bits removed from the infinite array (the set of bits 302+306 in the example shown in FIG. 3) represents a set of partial product bits whose sum we will refer to as $\Delta(x, q_j)$. The set of removed bits Δ depends on x because this sum is a function of the input bits x[m−1:0] and on $q_j$ because it depends on what value $q_j$ takes of the set of possible divisors. Δ can be expected to fall in the range [0, $\Delta_{max}$] because all the bits are unsigned. And given the choice of truncating at the $k^{th}$ column, it can be expected that $\Delta_{max}<1$.

Recall that whilst the set $\{q_j\}$ is known at design time, the input x is not. The array must be configured to operate to the desired level of accuracy for all possible inputs x and for each $q_j$. For a given removed set of bits Δ and a selected divisor $q_j$, the upper bound $\Delta_{max}$ can be identified by considering possible values of the most significant bits in the removed set. In other words, identify inputs $x_{high}$ such that $\Delta(x_{high})=\Delta_{max}$. This is because the most significant bits of the removed set necessarily have a higher value than the sum of all of the less significant bits in any array shape.

Noting that there cannot be two bits of x with the same index in the same column (due to the array being made up of copies of x in differing positions) and that each bit at the same bit position in x must be the same value throughout the array, it is possible to identify $\Delta_{max}$ for a given $q_j$ by identifying $x_{high}$ which is the value of x for which each bit value is 1.

Once $x_{high}$ has been identified, the maximum of the sum of the infinite set of bits $\Delta_{max}$ can be calculated for a given value $q_j$. This can be repeated for each value of $q_j$ of the set so as to identify $\Delta_{max}$ for each $q_j$.

The value of $\Delta \in \mathbb{Q}$ for general x is straightforward to calculate at design time for each $q_j$ since it's the difference between an exact answer $$\left\lfloor \frac{1}{q_j} * x \right\rfloor$$

(where x is again treated as a signed m-bit value) and the output of the finite summation array using the normalised $\hat{q}_j$, which can be denoted as $(2^{-i}\lfloor \hat{q}_j x \rfloor)_{finite}$. In other words:

$$\left\lfloor \frac{1}{q_j} * x \right\rfloor - \left(2^{-i}\lfloor \hat{q}_j x \rfloor\right)_{finite} = \Delta_j \tag{16}$$

And so, once $x_{high}$ has been identified for each $q_j$ of the set, $\Delta_j(x_{high})$ can be calculated to find the maximum value of the truncated bits for each j using:

$$\left\lfloor \frac{1}{q_j} * x_{high} \right\rfloor - \left(2^{-i}\lfloor \hat{q}_j x_{high} \rfloor\right)_{finite} = \Delta_j(x_{high}) = \Delta_{j,max} \tag{17}$$

It is not possible for the corrective constant c to perfectly compensate for the loss of the removed bits over all possible inputs x and for all divisors $q_i$. However, the constant c ensures that the integer value of the output is unchanged to the t-bit accuracy required over the range of possible values of the sum of the removed bits for all $q_j$ of the set. In other words, that the following is true for all x, j:

$$y[t-1:0] = \left\lfloor \frac{1}{q_j} * x \right\rfloor - \left\lfloor \left(2^{-i}\lfloor \hat{q}_j x \rfloor\right)_{finite} + c \right\rfloor \tag{18}$$

The set of maximum values of the truncated bits $\{\Delta_{j,max}\}$ can be used to identify a suitable value of the corrective constant c 310 which is to be included in the summation array so as to compensate for the removal of the infinite set of bits (e.g. 302, 306) in order to create a finite array. For example, the largest of the maximum values of the truncated bits may be used as the corrective constant c, the smallest of the maximum values of the truncated bits may be used as the corrective constant c, or an average (e.g. mean) of the maximum values of the truncated bits may be used as the corrective constant c. Note that it may not be necessary to form $\Delta_{max}$ for all values $\hat{q}_j$—for example, a single $\Delta_{max}$ could be identified corresponding to a single value $\hat{q}_j$ (e.g. the value $\hat{q}_j$ which yields the largest $\Delta_{max}$). In general, c could be derived according to the technique of the present example using one or more values $\Delta_{j,max}$.

In some implementations, the corrective constant may comprise other values required to correct for changes made to the partial products bits of the array for calculating $\lfloor \hat{q}_j x \rfloor$—e.g. c could be a sum of a value derived from one or more of maximum values of the truncated bits plus another corrective value. Such corrective values are sometimes required where x is transformed (e.g. from signed to unsigned form) so that the output of the array remains correct.

In some cases, the length of corrective constant c may be such that the bits of c extend beyond the column at which truncation is performed—e.g. in FIG. 3, beyond the $k^{th}$ column into less significant columns. In some cases, c could be infinite in length. Constant c may be truncated at the same column at which truncation is performed for the partial products of x—i.e. by removing all bits of c in columns less significant than the $k^{th}$ column.

In further examples, the equations (16) to (18) may be changed to use a different rounding mode than floor (such as one of the rounding modes in Table 1). For example, the ceiling operator can be used in the equations instead to derive corrective constants for the RTPI rounding mode. This enables one or more corrective constants to be determined for alternative rounding modes.

In some examples, the hardware may be implemented such the value of the constant c is selectable in the array at run time from a plurality of values—e.g. so as to enable the array to perform multiplication of an input x by a constant rational according to any one of a plurality of different rounding modes, or to improve accuracy of the array over the values $q_j$. For example, a set of corrective constants may be stored that correspond to the maximum values of the truncated bits $\{\Delta_{j,max}\}$ for each of the divisors $q_j$. Then, in operation, the corresponding corrective constant can be selected as needed for a given divisor $q_j$. Alternatively, a smaller set of corrective constants may be stored (e.g. similar values in the set $\{\Delta_{j,max}\}$ may be merged together to form a smaller set), with one or more divisors $q_j$ mapped to each constant for use at run time. In further examples, a set of different corrective constants may be derived for different rounding modes, and the appropriate one selected at run time for a desired operation. Sets of constants may also be maintained for combinations of different divisors and different rounding modes, such that a particular constant can be selected for a given divisor and a given rounding mode. The appropriate constant may be selected at run time through suitable configuration of one or more registers of an integrated circuit at which fixed logic circuit implementing the multiplication is provided. For example, by appropriately setting one or more registers, gates of a fixed logic circuit could be configured such that certain logic paths are enabled and others are disabled so as to allow the array to be configured to perform its summation including different values of the constant c, as appropriate to the particular rounding mode or particular divisor $q_j$.

Divisor Encoding

Normalising the divisor $q_j$ has the further advantage that it is possible to, using the same fixed hardware, compactly encode a set of divisors in hardware having a wide range of sizes. Equation (11) above casts the divisor $q_j$ as a normalised multiplier $\hat{q}_j$ having a value in the range [1,2). In decimal, $\hat{q}_j$ is therefore of the form "1.xxxxxxx . . . ".

Information defining the complete divisor $q_j$ can be stored as a fixed number of bits for a wide range of values of $q_j$. This is because a division $$\left\lfloor \frac{x}{q_j} \right\rfloor$$

is equivalent to an operation $2^{-i}\lfloor \hat{q}_j x \rfloor$ (see equation (12) above) which can be defined by the value of i and the number of bits after the radix point of $\hat{q}_j$ (e.g. in decimal, the number of digits "x" after the decimal point of "1. xxxxxxx . . . ").

In binary, a number of bits N can be selected for storing i which enables the desired set of divisors $\{q_j\}$ to be encoded. For example, 3 bits would encode bit shifts by up to 8 bit positions. The number of bits after the binary point of $\hat{q}_j$ is equal to the number of rows of the truncated array configured to perform the operation $\lfloor \hat{q}_j x \rfloor$ (i.e. not including the addition of corrective constant c). Only the bits after the binary point of $\hat{q}_j$ need to be stored since the value before the binary point is fixed as a "1". From equation (15) the number of rows and hence the number of bits to store to encode for all $\hat{q}_j$ $\hat{q}_j$ for all $q_j$ up to the accuracy at which the finite summation array operates is $m+\lceil \log_2 m \rceil-1$ bits. The total number of bits required to store for each $\hat{q}_j$ $\hat{q}_j$ (i.e. each divisor of the set) is therefore given by:

$$N+m+\lceil \log_2 m \rceil-1 \tag{19}$$

Configurable Array

Figure 4:
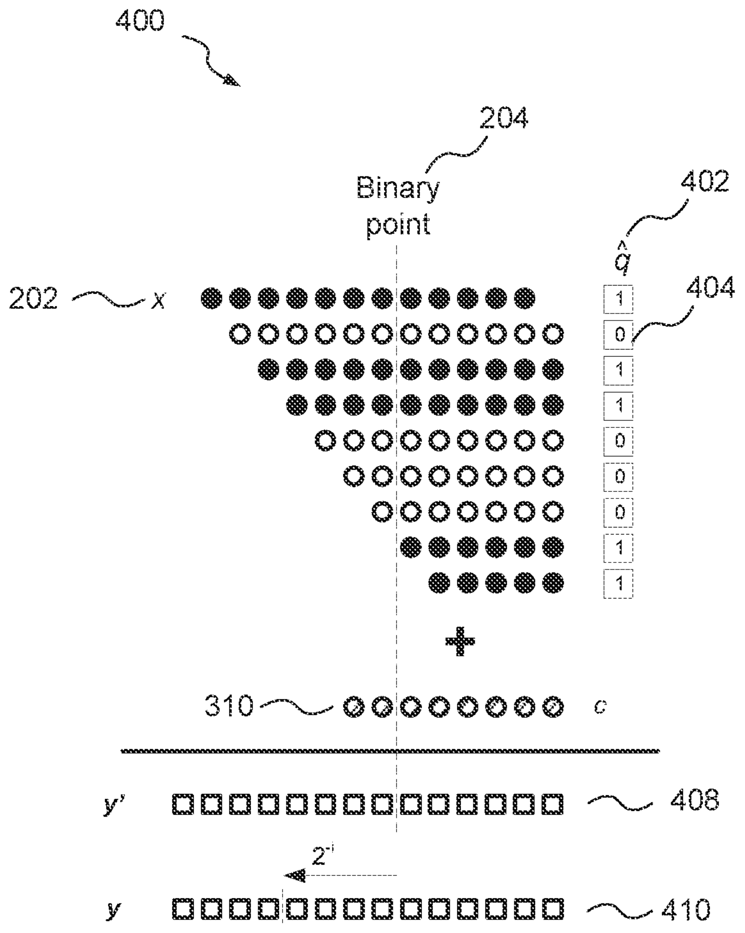
FIG. 4 is a configurable summation array arranged to perform multiplication of an input x by a binary expansion of 1/q.

In order to enable the finite summation array described above to perform the full operation $2^{-i}\lfloor \hat{q}_j x \rfloor$ for a set of different values of $\hat{q}_j$ (i.e. in respect of different divisors $q_j$), the array is configured such that each row of the array is controlled by its respective binary value of $\hat{q}_j$. This is illustrated by the schematic view of a configurable summation array 400 in FIG. 4, which has the same structure as the finite summation array 300 of FIG. 3 (i.e. the same number of rows, and truncated in the same manner) but the bit values of 404 of $\hat{q}_j$ 402 control each row of the array. Note that the number of rows of the array is the same as the number of bits of $\hat{q}_j$ after its binary point.

Each bit of $\hat{q}_j$ 404 can be a 1 or a 0. Thus, where the corresponding bit of a value $\hat{q}_j$ is a 0, all of the bits of x in that row can be set to zero—as depicted by the hollow circles in FIG. 4. Where the corresponding bit of a value $\hat{q}_j$ is a 1, all of the bits of x in that row take their true values. This can be implemented using AND gates, such that each bit value of x in a row is ANDed with the corresponding bit value of $\hat{q}_j$. Alternatively, a multiplexer can be configured to select between the bits of x and a row of zeroes, controlled by the corresponding bit value of $\hat{q}_j$.

Generating a Hardware Representation

The truncated addition arrays and associated logic described herein for performing multiplication by a constant fraction may be determined by suitable software. Typically, integrated circuits are initially designed using software (e.g. Synopsys® Design Compiler®) that generates a functional description of the desired integrated circuit in a hardware description language, such as a Register-Transfer Level (RTL) description. Once the logical operation of the integrated circuit has been defined, this can be used by synthesis software (e.g. Synopsys® IC Compiler™) to create representations of the physical integrated circuit embodying the defined functionality. Such representations can be defined in high level hardware description languages, for example Verilog or VHDL and, ultimately, according to a gate-level description of the integrated circuit.

Logic for performing multiplication by a constant rational/fraction can be readily introduced into an integrated circuit at design time. However, the design software used for designing integrated circuits will almost invariably provide the functionality using logic for performing generic division—i.e. logic for performing division by a divisor specified at runtime. Such logic is complex and consumes a significant area of integrated circuit.

Figure 6:
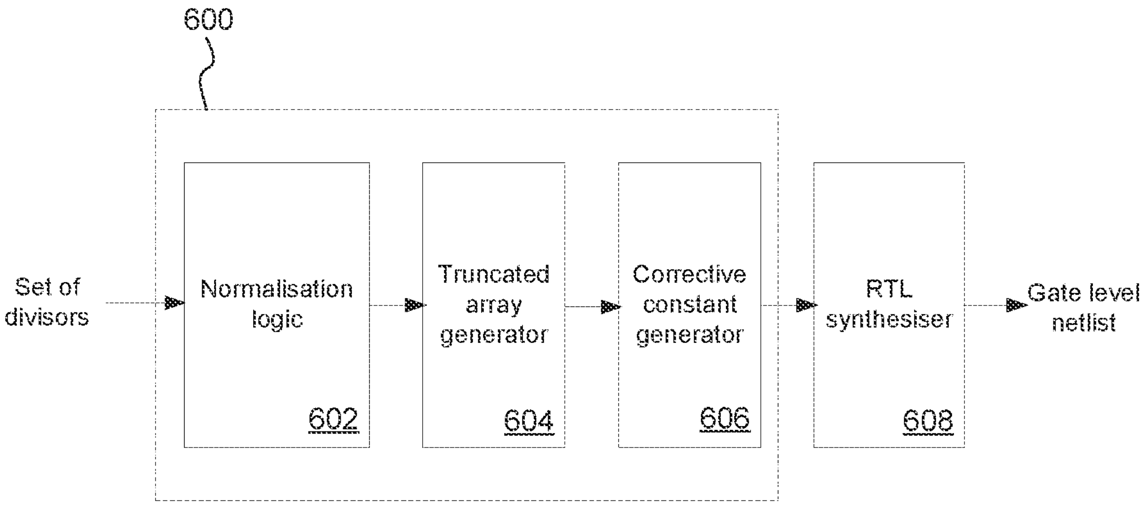
FIG. 6 is a schematic diagram of an exemplary hardware design system configured to generate RTL defining a truncated summation array.

It is advantageous if tools for designing integrated circuits are configured to, on a multiplication by a constant rational/fraction operation being specified by the designer, implement the operation as a truncated array in accordance with the design principles described herein. An exemplary hardware design system 600 is shown in FIG. 6 which is configured to generate RTL defining a truncated array according to the principles set out herein for synthesis at an RTL synthesiser 608—e.g. so as to generate, for example, a gate level netlist or other hardware description.

The hardware design system 600 includes normalisation logic 602 which receives as inputs a set of divisors defining a set of division operations x/q, where x is an input received by the hardware at runtime. The normalisation logic is configured to form a set of normalised multipliers $\{\hat{q}_j\}$ as described above in relation to equation (11). A truncated array generator 604 is configured to generate a truncated summation array in accordance with the principles set out herein. A corrective constant generator 606 is configured to determine one or more corrective constants for addition with the output of the truncated array—e.g. as described above in the "Corrective Constant" section. The hardware design system (and each of its components) may comprise, for example, one or more of software, hardware and firmware configured to implement the design principles described herein. The hardware design system may represent software for execution at apparatus comprising a processor and a memory.

Figure 5:
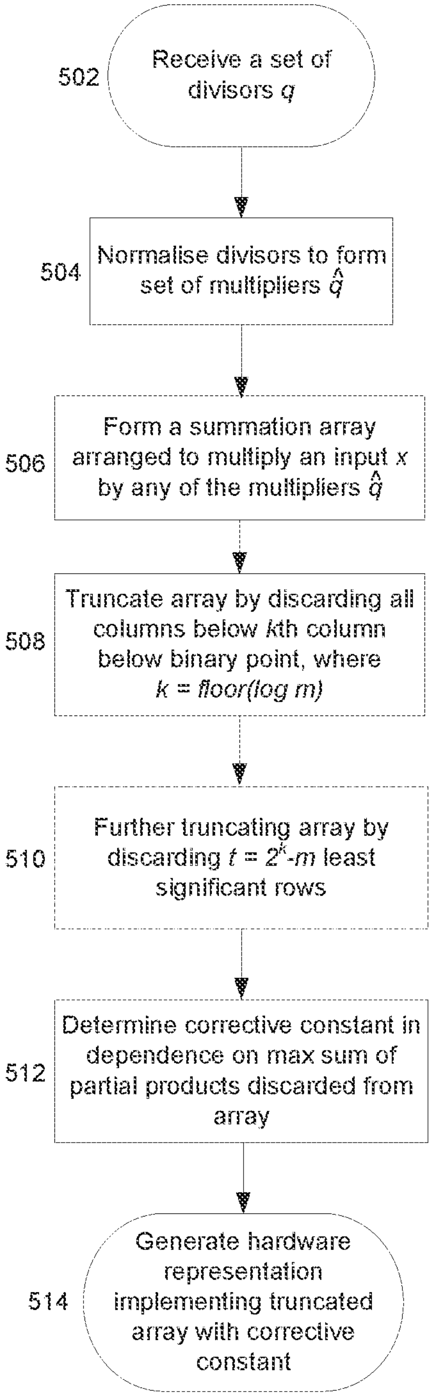
FIG. 5 is a flowchart illustrating a method for deriving a hardware representation of a fixed logic circuit for performing division of an input x by a divisor selectable from a plurality of divisors.

A method of deriving a hardware representation of a binary logic circuit in accordance with the principles set out herein is illustrated in the flowchart of FIG. 5. At 502, a set of divisors {q} is received which are to be used in implementing a fixed logic circuit for performing division of an input x by the set of divisors. The divisors are normalised at 504 to form a set of normalised multipliers. This could be performed in any suitable manner—for example, in accordance with equation (11) above. At 506 a summation array is formed to perform the multiplication of an input x by any of the multipliers.

The summation array is truncated 508 so as to discard all columns of the array below the $k^{th}$ column below the binary point, where $k=\lfloor \log_2(m) \rfloor$. A further truncation 510 may optionally be performed by discarding the $\tau=2^k-m$ least significant rows. Once truncation of the array has been performed, a suitable corrective constant is formed 512 in dependence on the maximum sum of the partial products discarded from the summation array by the truncation(s). The corrective constant ensures that the output y is accurate to the required precision. A hardware representation (e.g. RTL) of a fixed logic circuit implementing the truncated summation array including the corrective constant (e.g. as an addition to the output of the array) may then be generated 514 for synthesis in hardware as a fixed logic circuit. A fixed logic circuit refers to a circuit in which the low-level logic is adapted to perform an operation or set of operations which are fixed at manufacture of the circuit. Synthesis of the logic from the hardware representation may be performed in any suitable manner, as is well known in the art (e.g. through the use of suitable synthesis tools).

In some examples, at 512 a plurality of corrective constants may be calculated for use in the fixed logic circuit. As has been described herein, in a first example, a corrective constant may be calculated at 512 in respect of each of the set of multipliers, with, at step 514, selection logic being defined to at run time select the appropriate one of the corrective constants in dependence on the received multiplier. And in a second example, a corrective constant may be calculated at 512 in respect of each of a plurality of rounding modes in which the fixed logic circuit is to operate, with, at step 514, selection logic being defined to at run time select the appropriate one of the corrective constants in dependence on the rounding mode (which, for example, could be identified to the fixed logic circuit by appropriately setting a register of the fixed logic circuit).

It will be understood that it is not necessary to form the infinite array in order to discard columns from it—i.e. it is not necessary for the discarded columns to exist as any kind of representation in order for them to be discarded. Forming a truncated array by "discarding" columns may refer to forming a truncated array which does not (and never did) include the discarded columns.

The hardware representation of the binary logic circuit could be provided (typically as part of a larger-scale chip design) for fabrication into an integrated circuit. For example, a low-level representation of an IC could be provided directly to a foundry for fabrication of the specified integrated circuit, or RTL could be provided to an intermediate chip designer who would themselves design a low-level representation of an IC from the RTL for provision to a foundry.

It is to be noted that whilst the present disclosure refers to performing operations on an array and its values in respect of steps 504 to 518, neither the array nor any intermediate forms of the array may exist prior to generation of the hardware representation of the array.

Figure 8:
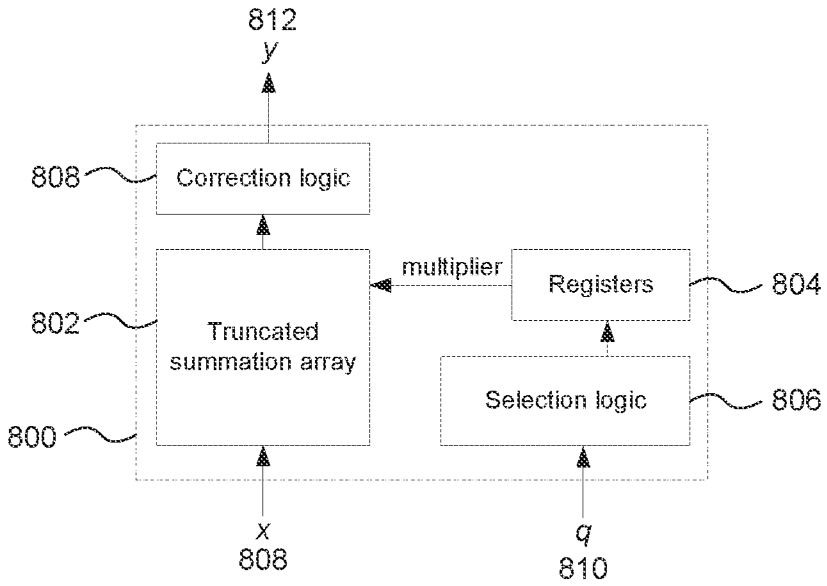
FIG. 8 shows a fixed logic circuit for performing division by a selectable divisor using a truncated addition array.

FIG. 8 shows an exemplary fixed logic circuit 800 for performing division by a selectable divisor using a truncated addition array. The fixed logic circuit comprises a truncated summation array 802 generated in accordance with the principles set out herein and a set of registers (or other data store) 804 configured to store a plurality of multipliers corresponding to normalised versions of the plurality of divisors. Selection logic 810 is configured to retrieve a multiplier from the registers based on an indication of the selected divisor q 810 received at the fixed logic circuit and cause the truncated summation array 802 to multiply the input x 808 by the retrieved multiplier. For example, the truncated summation array may be a configurable array as described above with reference to FIG. 4, with the selection logic 810 being arranged to configure the rows of the truncated addition array according to the bit values of the retrieved multiplier (e.g. by providing each bit value of the retrieved multiplier as an input to an AND gate such that each bit value of x in a row is ANDed with the corresponding bit value). A corrective constant generated in accordance with the principles set out herein is then summed with the output of the truncated summation array at correction logic 808 (e.g. at an adder) so as to provide the output y 812 of the selected division operation.

General Statements

Figure 7:
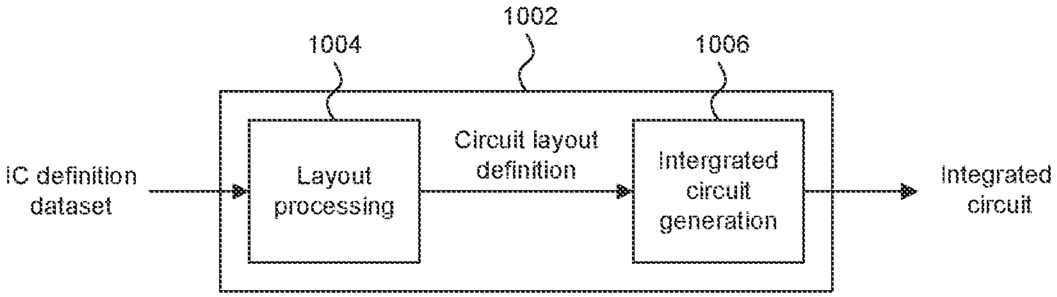
FIG. 7 shows an integrated circuit manufacturing system for generating an integrated circuit.

FIGS. 6 to 8 are shown as comprising a number of functional blocks. This is schematic only and is not intended to define a strict division between different logic elements. Each functional block may be provided in any suitable manner. It is to be understood that intermediate values or arrays described herein as being formed as part of the methods described herein need not be physically generated at any point.

The methods described herein are for generating logic suitable for inclusion in an integrated circuit. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be or comprise any kind of general purpose or dedicated processor, such as a CPU, GPU, NNA, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. The output of the methods and hardware design system described herein may be provided on a computer readable storage medium having encoded thereon computer readable program code in the form of an integrated circuit definition dataset that when processed (i.e. run) in an integrated circuit manufacturing system configures the system to manufacture fixed logic circuits for performing multiplication by a constant rational as described herein. An integrated circuit definition dataset may be, for example, an integrated circuit description.

Therefore, there may be provided a method of manufacturing, at an integrated circuit manufacturing system, a fixed logic circuit as described herein. Furthermore, there may be provided an integrated circuit definition dataset that, when processed in an integrated circuit manufacturing system, causes the method of manufacturing a fixed logic circuit to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS (RTM) and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a fixed logic circuit will now be described with respect to FIG. 7.

FIG. 7 shows an example of an integrated circuit (IC) manufacturing system 1002 which is configured to manufacture a fixed logic circuit as described in any of the examples herein. In particular, the IC manufacturing system 1002 comprises a layout processing system 1004 and an integrated circuit generation system 1006. The IC manufacturing system 1002 is configured to receive an IC definition dataset (e.g. defining a fixed logic circuit as described in any of the examples herein), process the IC definition dataset, and generate an IC according to the IC definition dataset (e.g. which embodies a fixed logic circuit as described in any of the examples herein). The processing of the IC definition dataset configures the IC manufacturing system 1002 to manufacture an integrated circuit embodying a fixed logic circuit as described in any of the examples herein.

The layout processing system 1004 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1004 has determined the circuit layout it may output a circuit layout definition to the IC generation system 1006. A circuit layout definition may be, for example, a circuit layout description.

The IC generation system 1006 generates an IC according to the circuit layout definition, as is known in the art. For example, the IC generation system 1006 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1006 may be in the form of computer-readable code which the IC generation system 1006 can use to form a suitable mask for use in generating an IC.

The different processes performed by the IC manufacturing system 1002 may be implemented all in one location, e.g. by one party. Alternatively, the IC manufacturing system 1002 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a fixed logic circuit without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 7 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 7, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A computer-implemented method for deriving a hardware representation of a fixed logic circuit for performing division of an input x by a divisor selectable from a plurality of divisors, where x is an m-bit integer, the method comprising:

normalising each of the plurality of divisors to form a plurality of multipliers;

forming a summation array arranged to multiply the input x by any one of the plurality of multipliers;

truncating the summation array by discarding all columns less significant than the $k^{th}$ column of the summation array below the position of a binary point, where $k=[\log_2 m]$;

determining a corrective constant in dependence on the maximum sum of the partial products discarded from the summation array for at least one of the multipliers; and generating a hardware representation of a fixed logic circuit implementing the truncated summation array including the corrective constant.

2. The method of claim 1, further comprising further truncating the summation array by discarding the τ least significant rows of the finite summation array remaining after the truncation of the summation array at the $k^{th}$ column, where $\tau=2^k-m$.

3. The method of claim 1, wherein the normalising is performed such that each of the plurality of multipliers lies in the range [1,2) when expressed in decimal format.

4. The method of claim 3, wherein the normalising comprises forming each of the plurality of multipliers as $2^i$ divided by the respective divisor, where i is selected such that the multiplier is in the range [1,2) when expressed in decimal format.

5. The method of claim 4, further comprising encoding each multiplier by storing i and a predetermined number of bits of the multiplier immediately after its binary point.

6. The method of claim 5, wherein the predetermined number of bits is $m+[\log_2 m]-1$ bits.

7. The method of claim 1, wherein the truncated summation array includes fewer than $m+[\log_2 m]-1$ rows.

8. The method of claim 1, wherein the determining the corrective constant comprises using as the corrective constant the largest maximum sum of the partial products discarded from the summation array calculated for the at least one of the plurality of multipliers.

9. The method of claim 1, wherein the calculating the maximum sum of the partial products discarded from the summation array comprises, for each divisor $q_j$ corresponding to the at least one of the plurality of multipliers, determining the difference between $$\mathrm{round}\left(\frac{1}{q_j} * x_{high}\right)$$

and the output of the truncated summation array, where $x_{high}$ is the input x having binary 1 for all bit values and round( ) is a rounding mode according to which the division operation is to be performed.

10. The method of claim 9, wherein the rounding mode is one of RTZ, RTNI, RTPI, RAZ, RTU, RTD, RNTZ, RNAZ, RTE and RTO.

11. The method of claim 1, wherein the determining the corrective constant comprises calculating for each of the plurality of multipliers the maximum sum of the partial products discarded from the summation array.

12. The method of claim 11, further comprising storing the corrective constant determined for each multiplier for use in the hardware representation of the fixed logic circuit, wherein the generating the hardware representation of the fixed logic circuit comprises defining logic for selecting at run time the appropriate corrective constant in dependence on the divisor selected from the plurality of divisors.

13. The method of claim 1, further comprising, performing the calculation of the maximum value of the bits discarded from the summation array for a plurality of rounding modes and storing the corrective constant determined for each of the plurality of rounding modes for use in the hardware representation of the fixed logic circuit, wherein the generating the hardware representation of the fixed logic circuit comprises defining logic for selecting at run time the appropriate corrective constant in dependence on the rounding mode according to which the division operation is to be performed.

14. The method of claim 1, further comprising truncating the corrective constant by discarding all bit values less significant than the $k^{th}$ column of the summation array below the position of a binary point.

15. The method of claim 1, wherein the generating the hardware representation of the fixed logic circuit comprises implementing the truncated summation array using AND gates arranged to, at run time, combine each bit value of x in a row with the corresponding bit value of the multiplier corresponding to the selected divisor.

16. A fixed logic circuit for performing division of an input x by a divisor selectable from a plurality of divisors, where x is an m-bit integer, the circuit comprising:

an input configured to receive x and an indication of a selected divisor from the plurality of divisors;

a stored plurality of multipliers corresponding to normalised versions of the plurality of divisors;

a truncated summation array arranged to multiply the input x by any one of the plurality of multipliers, where the number of rows of the truncated array is fewer than $m+[\log_2 m]-1$;

logic configured to retrieve a multiplier from the stored plurality of multipliers based on the indication of the selected divisor and cause the truncated summation array to multiply the input x by the retrieved multiplier so as to form a first result;

at least one stored corrective constant;

an adder arranged to add the corrective constant to the first result so as to form a second result; and an output configured to output the second result.

17. The fixed logic circuit of claim 16, wherein the at least one stored corrective constant includes a corrective constant for each of the plurality of multipliers and the logic is further configured to select a corrective constant corresponding to the retrieved multiplier for addition at the adder.

18. The fixed logic circuit of claim 16, wherein the input is further configured to receive an indication as to in which of a plurality a rounding modes the fixed logic circuit is to operate and the at least one stored corrective constant includes a corrective constant for each of the rounding modes, the logic being further configured to select a corrective constant corresponding to the indication of the rounding mode.

19. A non-transitory computer readable storage medium having stored thereon computer readable code that, when executed at a computer system, causes the computer system to perform the method of deriving the hardware representation of a fixed logic circuit as set forth in claim 1.

20. A non-transitory computer readable storage medium having stored thereon computer readable code comprising a hardware dataset representation of a fixed logic circuit for performing division of an input x by a divisor selectable from a plurality of divisors, where x is an m-bit integer, the hardware dataset representation derived by:

normalising each of the plurality of divisors to form a plurality of multipliers;

forming a summation array arranged to multiply the input x by any one of the plurality of multipliers;

truncating the summation array by discarding all columns less significant than the $k^{th}$ column of the summation array below the position of a binary point, where $k=[\log_2 m]$;

determining a corrective constant in dependence on the maximum sum of the partial products discarded from the summation array for at least one of the multipliers; and generating a hardware representation of a fixed logic circuit implementing the truncated summation array including the corrective constant;

whereby the computer readable code, when processed in an integrated circuit manufacturing system, causes the integrated circuit manufacturing system to manufacture an integrated circuit embodying the fixed logic circuit.

* * * * *